UNITED STATES PATENT OFFICE.

RALPH H. McKEE, OF RIDGEFIELD PARK, NEW JERSEY.

FERMENTED LIQUOR FROM NUTS.

1,322,194.      Specification of Letters Patent.      Patented Nov. 18, 1919.

No Drawing.      Application filed June 20, 1917. Serial No. 175,842.

*To all whom it may concern:*

Be it known that I, RALPH H. McKEE, a citizen of the United States, residing at Ridgefield Park, in the county of Bergen and State of New Jersey, have invented certain new and useful Improvements in Fermented Liquors from Nuts, of which the following is a specification.

This invention relates to the production of fermented liquors from nuts, notably nuts containing a low content of oil, preferably not to exceed 5 per cent. by weight and, in its preferred embodiment, has particular reference to the production of diastase containing material, alcohol and alcohol containing liquids such as beer from ramoon nuts.

The ramoon is a small West Indian tree, *Trophis Americana*, of the mulberry family whose leaves are often used as fodder for cattle. The tree also grows in Mexico and possibly elsewhere.

The seeds of the ramoon tree are commonly known as "ramon" nuts by the Spanish speaking natives, the English equivalent being "ramoon" nuts. They are nut-like in appearance and character and contain less than 1 per cent of oil, one analysis showing a content of .65 per cent. At present these nuts are a waste material.

In the practice of my process in its preferred form, the ramoon nuts are allowed to germinate until the diastase content has reached the maximum or the proportion desired. This may be determined by the examination of a test sample. When the diastase content has reached the desired proportion, the growth is stopped by heating the nuts to preferably about 150° F. If it is desired that the fermented liquor be of a dark color then a higher temperature is employed in the heating kiln, such temperature being carried even as high as 220° F. where a very dark color is desired.

The material thus produced is employed in the preferred practice of my process in the treatment of ground ramoon nuts as hereinafter set forth.

It is believed that the production of diastase as described is novel.

The nuts from which fermented liquor is to be made are first ground and the carbohydrate content transformed into fermentable sugar by mixing the ground nuts with germinated ramoon nut produced as herein before described, and water and maintaining them at a temperature of preferably about 145° F. until the examination of a test sample shows the maximum or a desired development of fermentable material.

I have found that some measure of practical success may be obtained by employing ground malt in place of the germinated ramoon nuts and also that some measure of practical success may be obtained in transforming the carbohydrate content of the nuts into fermentable matter by the use of chemical reagents such, for example, as dilute hydrochloric acid. The solution or wort resulting from the treatment of the nuts to transform the carbohydrate matter contained therein into fermentable material is preferably, though not necessarily, filtered. If malt is used, there is no difficulty in obtaining a liquid substantially free from suspended matter as the layer of barley husks on the perforated, false bottom of the mash tub acts as an excellent filter mass. In using germinated ramoon nuts or chemical reagents as described for obtaining the fermentable material from the carbohydrates of the nuts, some difficulty is encountered in obtaining a clear, bright liquid owing to the lack of a satisfactory filter mass being present. However, by using a separate filter mass as, for example, paper pulp or the like, the wort may be obtained substantially free from suspended matter by filtration.

The solid material filtered off is then dried and may be advantageously used as a fodder for feeding domestic animals for which purpose it has a high food value.

From the wort produced as described alcohol may be obtained by fermentation and distillation by the methods well known to those skilled in the art.

In producing a beverage such as beer, the wort obtained as described is boiled with hops, filtered, cooled, and fermented with yeast. The resulting product is carbonated, clarified, filtered and racked into the customary trade packages by the methods commonly used in the fermentation industries. If desired, alcohol may be obtained by well known distillation processes from the alcohol containing liquid produced as above described.

While I have described in detail the preferred practice of my process, it is to be understood that the details of procedure may be widely varied without departing from the spirit of my invention or the scope of the subjoined claim.

Having described my invention, I claim:

The herein described fermented liquor containing the fermented soluble portion of ramoon nuts.

In testimony whereof I affix my signature in presence of two witnesses.

RALPH H. McKEE.

Witnesses:
 HELEN MILLER NOYES,
 B. C. DIEKMAN.